Jan. 17, 1933.　　　　　D. BROWN　　　　　1,894,394
SHINGLE MACHINE
Filed Dec. 19, 1930　　　2 Sheets-Sheet 2
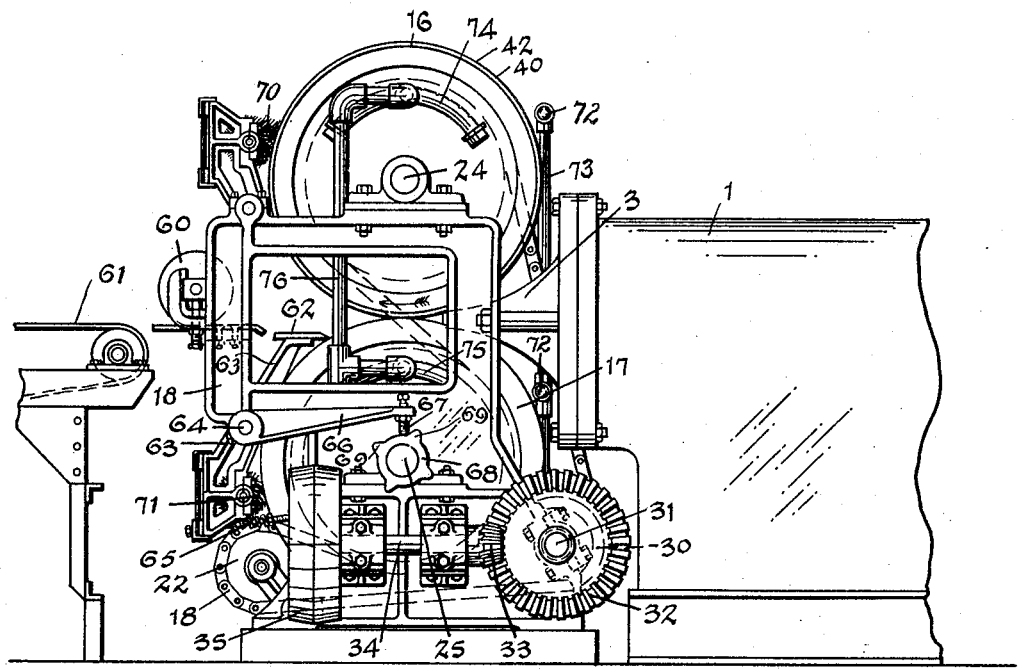
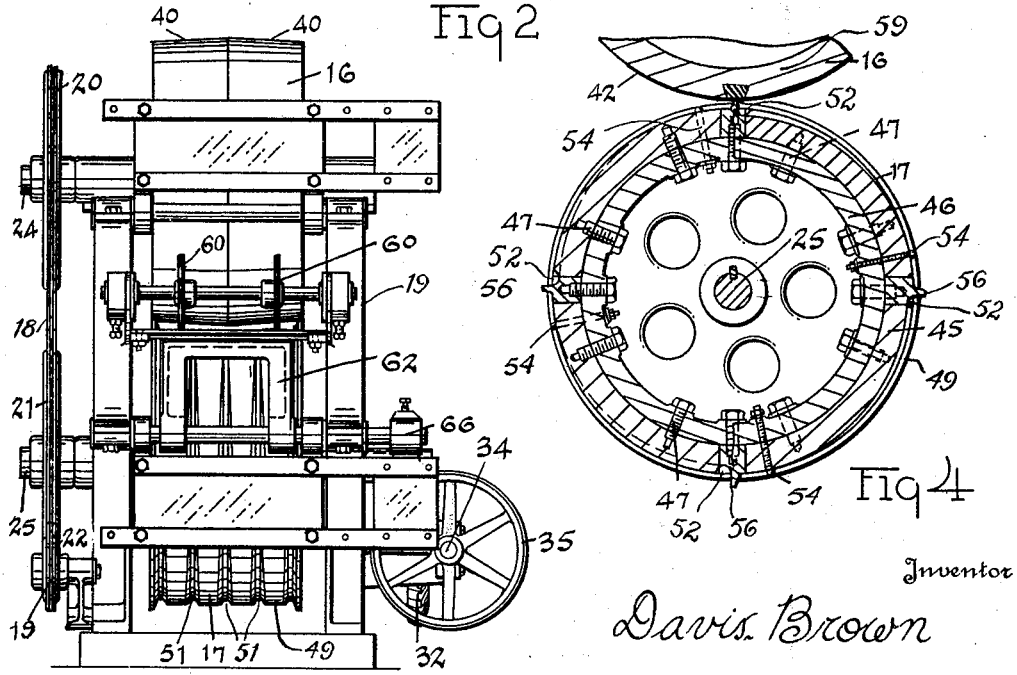
Inventor
Davis Brown
By Wilson, Dowell, McCanna & Rehm
Attorneys Patented Jan. 17, 1933

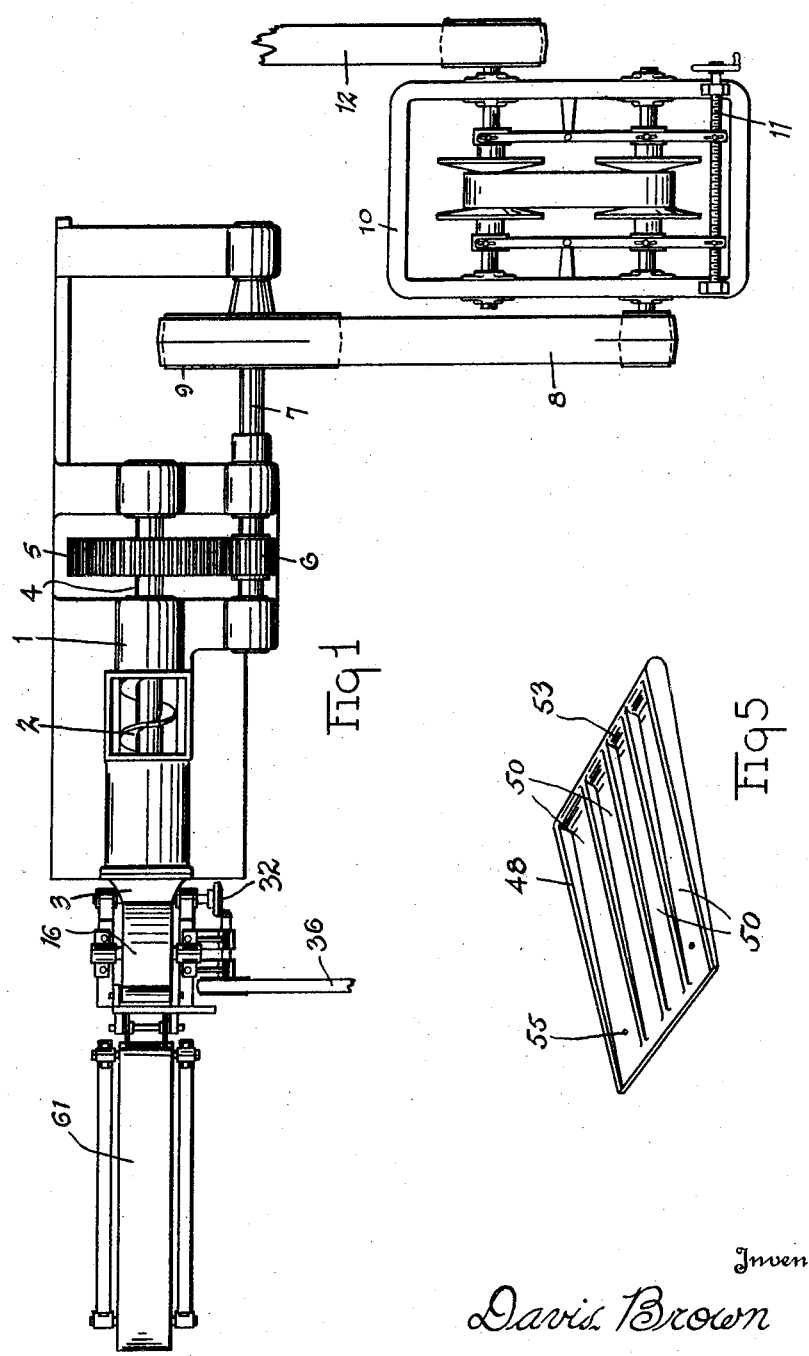

1,894,394

UNITED STATES PATENT OFFICE

DAVIS BROWN, OF LOS ANGELES, CALIFORNIA

SHINGLE MACHINE

Application filed December 19, 1930. Serial No. 503,357.

My invention relates to machines for working and forming plastic materials and its purpose is to provide a machine particularly well adapted to produce shingles or other articles from plastics. The machine includes means for treating a plastic as it is extruded from an extrusion machine to obtain a variety of clay forms, such as shingles. My invention also provides for the shaping of the plastic so as to obtain shingles of varying lengths and having the necessary rigidity to withstand the shocks incurred by handling and use of the shingle.

My invention may further provide for controlling the relative speeds of linear movement of the plastic and plastic treating mechanisms to produce desired effects.

The invention may be contained in forming machines of different kinds and, to illustrate a practical application of the invention, I have selected a shingle forming machine as an example of such constructions, and shall describe it hereinafter. The particular machine referred to is shown in the accompanying drawings.

Fig. 1 is a top view of the machine illustrating the location of the machine relative to its source of power, Fig. 2 is a side view of the machine, Fig. 3 illustrates a front view of the machine, Fig. 4 illustrates a cross sectional view of the lower roller and part of the upper roller of the machine shown in Fig. 1, and Fig. 5 illustrates a perspective view of a shingle produced by the machine illustrated in Fig. 1.

In general the machine illustrated in the drawings is adapted to produce shingles from a plastic. The plastic, such as clay, mastic asphalt, or asbestos, is extruded by a conventional extrusion screw driven through a variable speed device, through an orifice to a pair of rollers. The orifice is preferably so positioned relative to the rollers as to form a substantially closed passageway between the extrusion screw and the rollers. This closed passageway is particularly desirable when the rollers are driven at a lower peripheral speed than the discharge speed of the extruding machine because in this case there is a retarding action of the rollers which creates a pressure in the closed chamber, the amount of pressure depending on the relative speed of the rollers and the extrusion screw. In some instances it is desirable to feed the plastic at a higher speed than the peripheral speed of the rollers to cause the plastic to slip as it passes between the rollers, that is, to flow at a faster rate of speed than the peripheral speed of the rollers. The machine may thus be used to produce longer shingles or shorter shingles on the same forming rollers, as the speed of the extrusion screw is increased or diminished. In other instances it may be desirable to drive the rollers at the exact speed of the discharge of the extruding machine.

In the specific forming machine shown in the drawings, a plastic, such as clay, is extruded by the usual extruding machine 1 that is provided with an extrusion screw 2 and an orifice or die 3. The extrusion screw 2 is rotated, to force the clay through the orifice 3, by a shaft 4 on which may be located a gear wheel 5. A cog wheel 6 is located on a shaft 7 so as to mesh with the gear wheel 5. Shaft 7 is rotated by a pulley 9 on the shaft 7 driven from a belt 8.

In order to vary the speed of rotation of the extruding screw and, consequently, vary the pressure which forces the clay to pass through the die 3 to the shaping rollers, the belt 8 connects the pulley 9 to a variable speed transmission device, such as the device 10. The transmission device 10 may be of the well known conical type, whereby any desired degree of speed may be transmitted by adjusting the screw 11 of the device. The transmission device 10 is connected by a belt 12 to a suitable source of driving power. Thus the clay may be forced outwardly through the die at varying speeds or pressures.

The plastic material is fed by die 3 directly into the bight of a pair of shaping rollers 16 and 17 supported in a frame 18 rotated by a cable or sprocket chain 19 which operatively connects sprocket wheels 20 and 21 over an idler 22 to a driving sprocket wheel 30. Sprocket wheel 20 is keyed to a shaft 24 on which is located the roller 16, and sprocket wheel 21 is keyed to a shaft 25 on which the roller 17 is located. The sprocket chain 19 so connects the sprocket wheels 20 and 21 with the idler 22 and the driving sprocket wheel 30 as to rotate the rollers 16 and 17 in the direction indicated by the arrow in Fig. 2. The driving sprocket wheel 30 is rotated by a shaft 31 on which is located a bevelled gear 32. The bevelled gear wheel 32 is arranged to mesh with a pinion 33 keyed to a common shaft 34 with a pulley 35. The pulley 35 may be connected by a belt 36 to some suitable source of power which source may be connected through a suitable variable speed device if so desired. Thus the forming rollers 16 and 17 will be rotated at a relatively constant rate of speed or any desired speed to give the clay substantially the same finished configuration desired regardless of the speed with which the clay may pass between the rollers.

In order to configure the clay as it is received from the orifice or die 3, the rollers 16 and 17 may be shaped to coact, one to shape the clay and the other to compress it. The roller 16 is preferably formed with inclined intersecting plane surfaces 40 which engage and finish the upper side of the shingle and tend to force the clay into and about a forming surface 41 on the roller 17.

As the clay is received from the orifice it will preferably be under some degree of pressure, and would except for my invention tend to travel faster through the center portion of the orifice than through the side portions, which would set up, in the plastic ware, strains that would cause losses in the drying and burning processes to which the ware must be subjected, after the completion of the forming. In order to retard the movement of the clay which is extruded centrally with relation to the orifice and to assist the movement of the clay which is extruded in the sides of the orifice so as to eliminate strains from the finished ware, the surfaces 40 of the roller 16 are inclined or slightly crowned as previously stated and convex, as shown in Fig. 2. Thus, the central or intersecting line of surfaces 40 will form a barrier to the rapidly moving central portion of the extruded clay. The pressure must therefore be dissipated by forcing the issuing clay into the side portions of the orifice at a faster rate of speed and, thereby, causing an even distribution of the clay preparatory to its being configured by the surface of the roller 17.

In order to produce a desired configuration of the underside of the shingle, the surface 41 of the roller 17 is made up of segments 45 which are supported on a core 46 of the roller 17 by suitable cap screws 47. The segments 45 may have any desirable pattern formed thereon and may, for example, provide reenforcing ribs 48 on the shingle which tend to reduce the fragility of the shingle. The segments may be easily removed so as to permit substitution of other segments and patterns, as they are required or desired.

In the form of construction shown in the drawings, the segments 45 have spaced peripheral surfaces 49 which are concentric to the axis of rotation of the core 46, which forms the body 50 of the shingle of uniform thickness. The surfaces 49 are spaced by tapered grooves 51 tapered in both width and depth to provide the tapered strengthening ribs 48 of the shingle, which ribs strengthen the finished shingle and in effect produce a tapered shingle. The segments 45 are also provided with transverse grooves 52 which form a transverse end rib 53 upon the finished tile. Punches 54 are set in the surfaces 49 to form suitable nail holes 55 in the finished shingle. If desired punches may be provided in both rolls to punch partly through from each surface.

In order to separate the shingles from each other, the surfaces 49 are provided with cutting bars 56 which extend slightly beyond the peripheral line of the roller so as to sever the ends of the shingle, that is, separate the plastic material which is being received from the extrusion machine into shingle lengths. The upper roll may be provided with resilient inserts 59 positioned to engage the bars 56. The shingle is sized to a desirable width by cutting discs 60, from whence it is delivered to a conveyor belt 61.

In order that the rollers 16 and 17 may suitably work and shape the clay, their surfaces are preferably cleaned, polished, and oiled, which allows free movement of the clay body over the surfaces of the rollers as the clay is pressed to the desired shape. The surfaces 49 of roller 17 are scraped by a suitable scraper 62 which is located against the surface of the roller by an arm 63. The arm 63 is pivotally supported in the framework 19 by a shaft 64. A spring 65, one end of which is connected to the arm 63, and the other end to the framework 19, holds the scraper against surfaces 49. In order to allow protruding portions, such as the cutting bars 56, to pass under the scraper, an arm 66 is keyed to shaft 64 and is provided with an adjustable nose 67 in one end. The nose 67 is adapted to ride the surface of a cam 68 keyed to shaft 25. The cam 68 has raised portions 69 which move arm 66 upwardly and arm 63 with the scraper 62 away from the surface of the roller 17 against the action of spring 65. The raised portions 69 of the cam are so located on the cam as to cause the movement of the scraper away from the surface of the roller when the protruding parts on the surface of the roller approach the locality of the scraper. When the raised portions 69 of the cam have passed under the nose 67 of arm 66, spring 65 causes the return of the scraper against the surface of the roller. Suitable notches may be provided on the face of the scraper 62 to allow the passage of punches 54. A similar scraper and associated mechanism may be applied to the upper roller if desired.

In order to remove any remaining clay from the surfaces of either of the rollers 16 or 17, the rollers are continuously brushed by rotary brushes 70 and 71 which may be driven by any suitable means, such as a sprocket chain (not shown) to any of the rotating parts. Any small particles of clay are thus removed from the surfaces preparatory to oiling the surfaces. Additional rollers or kinds of brushes may be provided to clean the rolls as becomes desirable or necessary.

The surfaces of the rollers are oiled by suitable spray pipes 72 which are located so as to distribute a thin coat of oil on the roller surfaces. The spray pipes are connected by a pipe 73 to any suitable pressure pump and oil supply (not shown).

The rollers 16 and 17 may be heated to warm the surfaces thereof so that the rollers may more efficiently knead and form the plastic material. The heating may be by gas as shown in the drawings, or by electricity, or steam. In the illustrated embodiment the rollers 16 and 17 are heated by gas burners 74 and 75 located under the peripheries of the rollers. The burners are supplied with fuel gas through pipes 76. Thus, the surfaces of the rollers are maintained in a relatively warm condition, which aids materially in working some plastic materials.

It is apparent from the foregoing description that a fully automatic machine has been provided which will receive plastic material from the extruding nozzle and form the same into articles such as tile having any desired configuration.

Suitable means are provided for adjusting the relative speeds of the various elements whereby they may be timed to any desired relation. It has been found desirable in most instances to drive the extruding machine at a slightly greater speed than the forming rollers. This builds up a pressure in the nozzle of the extruding machine and causes the body of plastic material to be slipped to some extent through the rolls. This insures a complete filling of the molds and a compactness of the plastic material. In some instances, however, it may be desirable to run the rolls and the extruding machine in exact synchronism. This may be accomplished by manipulation of the variable speed device or devices when two are used.

It is also possible to produce shingles of varying lengths from the same forming rolls by merely varying the pressure in the nozzle of the extruding machine to cause more or less slip of the plastic material through the rolls.

It is obvious that many changes may be made in the details of construction such as varying the contour of the rollers or the addition of other rollers to vary the configuration of the tile without departing from the spirit of the invention as defined by the claims.

I claim:

1. In a machine for forming products from plastic material, means for producing a column of plastic material, a pair of forming rolls arranged to receive the column of plastic material, one of said rolls having molds of irregular contour on the outer surface thereof, means for positively actuating said rolls, a scraper for cleaning one of said rolls, and means for retracting said scraper at predetermined periods.

2. In a plastic material forming machine, an extrusion screw, a die, means for rotating the extrusion screw, a pair of rollers located in close proximity to the die, one of the rollers having a crowned surface to retard the movement of a portion of the plastic material.

3. In a machine for forming products from plastic material, means for producing a column of plastic material, a pair of forming rolls arranged to receive the column of material, one of said rolls having molds on the outer surface thereof, means for positively actuating said rolls at a constant speed, and means for forcing the column of clay through said rolls at a lineal speed greater than the peripheral speed of said rolls.

4. In a machine for forming products from plastic material, means for producing a column of plastic material, a pair of forming rolls arranged to receive the column of material, one of said rolls having molds on the outer surface thereof, means for positively actuating said rolls at a constant speed, means for forcing the column of clay through said rolls at a lineal speed greater than the peripheral speed of said rolls, and means for varying the speed of said latter means.

5. In a machine for forming products from plastic material, the combination of an extruding device including means for positively driving said extruding device, and forming devices arranged to receive the column of plastic material from said extruding device for forming the same into the desired product, said latter devices including means for positively driving the same, with means for varying the relative rates of linear movement through said two devices to vary the characteristics of the finished product.

6. In a machine for forming products from plastic material, the combination of an extruding device including means for positively driving said extruding device, and forming devices arranged to receive the column of plastic material from said extruding device for forming the same into the desired product, said latter devices including means for positively driving the same, with means for controlling the relative rates of linear movement through said two devices to maintain a selected characteristic of the finished product constant.

7. In a machine for forming products from plastic material, the combination of an extruding device including means for positively driving said extruding device, and forming devices arranged to receive the column of plastic material from said extruding device for forming the same into the desired product, said latter devices including means for positively driving the same, with means for varying the pressure at which the plastic material is fed to the forming devices independently of the speed of movement of said latter devices to maintain a predetermined rate of linear travel of the plastic material through the machine.

8. In a machine for forming products from plastic material, the combination of devices for treating the plastic material to form the desired product therefrom including means for positively driving said devices and an extruding device for forming a column of plastic material and feeding it to said treating device, said extruding devices including means for positively driving said latter devices to feed the material to said forming devices at a predetermined pressure, with confining means surrounding the column of plastic material between said two devices for maintaining the plastic material under said predetermined pressure as it is transferred from one device to the other.

9. In a machine for forming products from plastic material, the combination of devices for treating the plastic material to form the desired product therefrom including means for positively driving said devices and an extruding device for forming a column of plastic material and feeding it to said treating device, said extruding devices including means for positively driving said latter devices to feed the material to said forming devices at a predetermined pressure, with a closed chamber between the nozzle of said extruding devices and said forming devices, said nozzle completely surrounding the column of plastic material to maintain the plastic material under said predetermined pressure as it is transferred from one device to the other.

In witness of the foregoing I affix my signature.

DAVIS BROWN.